United States Patent [19]

Frey

[11] 3,799,665

[45] Mar. 26, 1974

[54] SLIDE PROJECTOR WITH NON-SLIPPING ENDLESS SLIDE HOLDER

[76] Inventor: Gerald J. Frey, 3887 State St., Suite 202, Santa Barbara, Calif. 93105

[22] Filed: Dec. 27, 1971

[21] Appl. No.: 212,101

[52] U.S. Cl. ............................................. 353/109
[51] Int. Cl. ............................................ G03b 23/08
[58] Field of Search ................... 274/4 F; 353/109

[56] References Cited
UNITED STATES PATENTS

| | | | |
|---|---|---|---|
| 3,139,788 | 7/1964 | Hughes et al. | 274/4 F |
| 2,288,934 | 7/1942 | Barth et al. | 353/109 |
| 1,072,861 | 9/1913 | Koike | 353/109 |
| 2,521,348 | 9/1950 | Davis | 353/109 |
| 3,494,622 | 2/1970 | Zeigler | 274/4 F |

FOREIGN PATENTS OR APPLICATIONS 163,687   4/1921   Great Britain .................. 353/109

Primary Examiner—Harry N. Haroian
Attorney, Agent, or Firm—Fulwider, Patton, Rieber, Lee & Utech

[57] ABSTRACT

A slide projector with parallel supporting shafts for receiving an endless flexible slide holder around them and feeding the holder step by step to advance successive slides into a film gate. The slide holder is formed by an endless fabric belt having spring clips around its outer slide, and the clips have projecting end portions along one edge of the belt engageable as driving abutments with driving teeth on one of the shafts. In one form, the abutments are the projecting end portions of alternating clips longer than the intervening clips, and in another embodiment, the abutments are the edges of apertures formed in the projecting end portions of all of the clips, which are of the same length.

10 Claims, 8 Drawing Figures

PATENTED MAR 26 1974  3,799,665

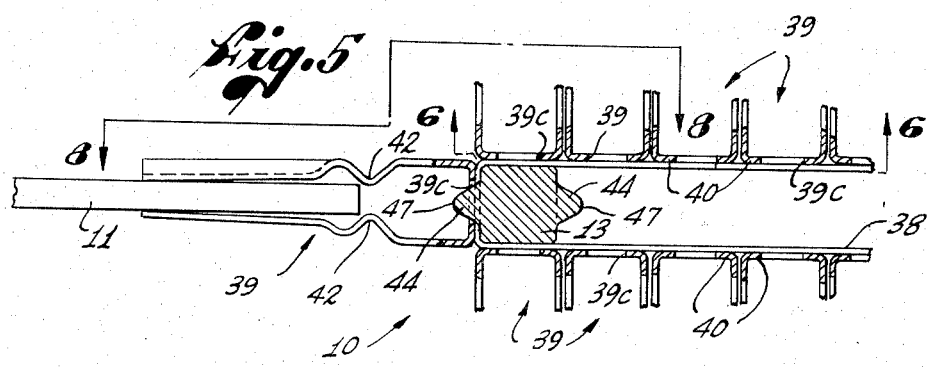
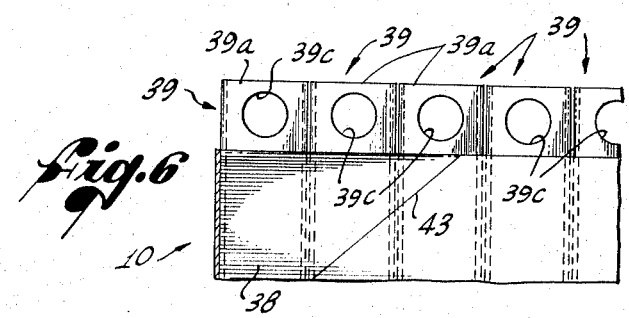
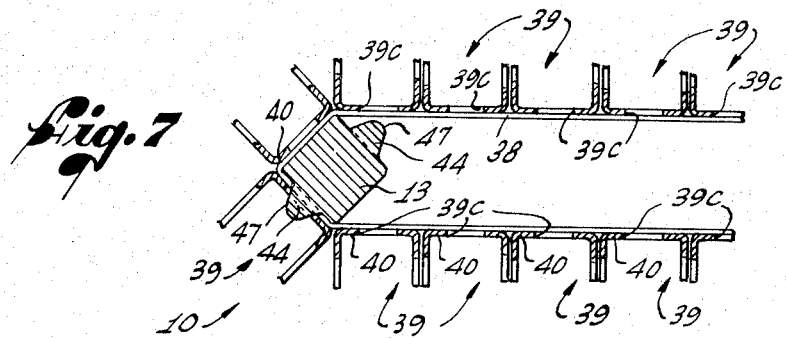
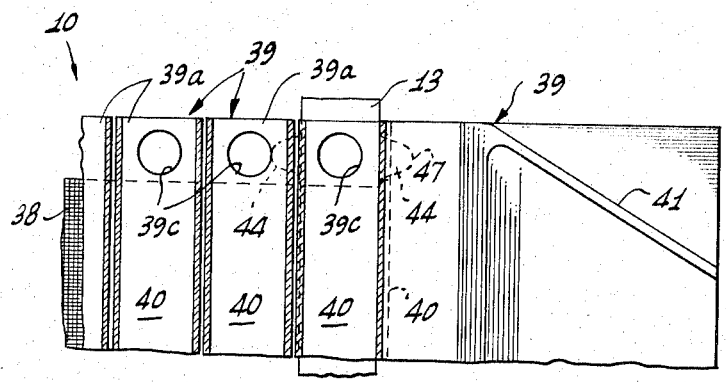

«3,799,665»

SLIDE PROJECTOR WITH NON-SLIPPING ENDLESS SLIDE HOLDER

BACKGROUND OF THE INVENTION

This invention relates to slide projectors of a type using an endless flexible slide holder comprising a plurality of slide-gripping members flexibly joined together in an endless series, to be advanced step by step around two parallel supporting elements such as two parallel shafts, thereby to feed each gripping member, and the slide held therein, into a projection position extending outwardly from one side of one of the shafts. In the projection position, the slide is located in the film gate of the slide projector, so that an image from the transparency in the slide can be viewed on a screen or the like.

One projector of the foregoing general type is disclosed in U.S. Pat. No. 3,170,369, in which two shafts for supporting the slide holder are mounted in spaced parallel relation in an open-ended magazine mounted in the top of the projector, and the lower shaft, which is square in cross-section, is coupled to the projector to be turned step-by-step by a drive mechanism built into the projector. As the slide holder is driven about the two shafts, successive slide-holding members in the form of clips are moved into the projection position, below the square shaft, so that the slides in the clips extend downwardly through the film gate and can be positioned accurately relative to the square shaft for projection.

In another, more recently developed projector, shown herein for illustrative purposes, the two shafts are permanently mounted in the projector in upright parallel relation to receive an unsupported flexible slide holder through an access opening in the top of the projector, and one shaft is driven step by step to feed successive slides into a film gate on one side of one of the shafts. The shaft alongside the film gate of this projector preferably is square in cross-section so that the slide to be projected can be accurately located relative to the shaft while the two adjacent slides are held in out-of-the-way positions.

The preferred slide-holder for both of these projectors comprises an endless flexible belt, to the outer side of which slide-gripping members in the form of spring clips are attached in closely spaced, side-by-side relation extending transversely across the width of the belt. The belt preferably is composed of fabric, and is tensioned around the shafts to be driven by the shaft which is coupled to the drive mechanism of the projector.

SUMMARY OF THE INVENTION

The present invention resides in the combination of such a projector with an improved slide holder which makes it possible to provide a positive, non-slip drive for the belt-type slide holder in a novel and extremely simple and inexpensive manner, and to insure that each increment of rotation of the driving shaft results in a corresponding increment of feed of the slide holder. This is accomplished by using the slide-gripping clips to form drive abutments along one edge of the belt, and by providing a toothed connection on the driven shaft for interfitting in driving relation with the drive abutments.

More specifically, and as incorporated in the one embodiment shown herein for purposes of illustration, alternating slide-gripping clips around the slide holder have end portions which project beyond one edge of the belt, and beyond the ends of the intervening clips, so that these end portions serve as the drive abutments and define the drive recesses. Preferably, these clips are of two different lengths so that the ends along the opposite edge of the belt can be aligned. Two driving teeth project from opposite sides of the square shaft along the path of the edge of the belt, to interfit with the ends of the clips and have side surfaces for engaging the clips and preventing slipping of the holder relative to the shaft.

In another, presently preferred embodiment, all of the clips overhang one edge of the belt and are formed with apertures along the edge of the belt for engaging the driving teeth on the shaft. With this arrangement, all of the clips may be made the same length, and with ends that are aligned along both edges of the belt, and there is no problem of alignment of the driving teeth and the abutments on the clips as the slide holder is installed in a projector.

Other objects and aspects of the invention will become apparent from the following detailed description, taken in conjunction with the accompanying drawings.

BRIEF DESCRIPTION OF THE DRAWINGS

FIG. 5 is a view generally similar to FIG. 4 but showing a second embodiment of the invention;

FIG. 6 is a fragmentary cross-sectional view taken alone line 6—6 of FIG. 5;

FIG. 7 is a view similar to part of FIG. 5 showing the parts as the slide holder is moving; and FIG. 8 is a fragmentary cross-sectional view taken along line 8—8 of FIG. 7.

DETAILED DESCRIPTION

Figure 1:
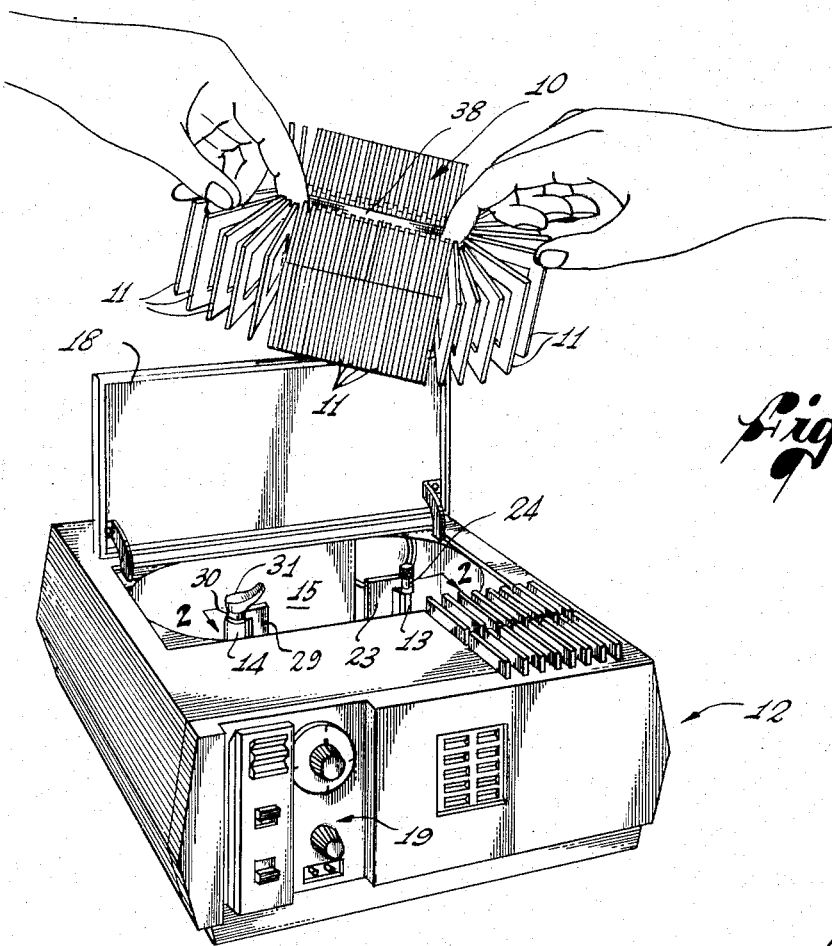
FIG. 1 is a perspective view of a slide projector for use in the present invention, shown with a first embodiment of a slide holder that is about to be placed in the projector.

As shown in the drawings for purposes of illustration, the invention is embodied in an endless flexible holder 10 for a plurality of framed transparencies 11, herein called slides, and a slide projector 12 for receiving the slide holder and advancing the latter step by step around two supporting elements 13 and 14 in a recess 15 in the projector, to feed the slides thereon one by one into a projection position 17 (FIG. 2) in which the slides are disposed in the film gate of the projector. This film gate is alongside the supporting element 13, on the right side thereof as viewed in FIG. 1 and on the left side in FIG. 2.

In general, the illustrative projector 12 comprises a case having an access opening its top wall overlying the recess 15, a hinged cover door 18 for closing this opening when the projector is in use, a control panel on its rear wall, indicated generally at 19 and an optical system (not shown) for projecting the slides when they are in the film gate. The optical system will include a lamp in the rear right corner of the case, and lenses in front of the lamp on opposite sides of the film gate. These elements are not shown herein because they may be conventional in construction and operation.

Figure 2:
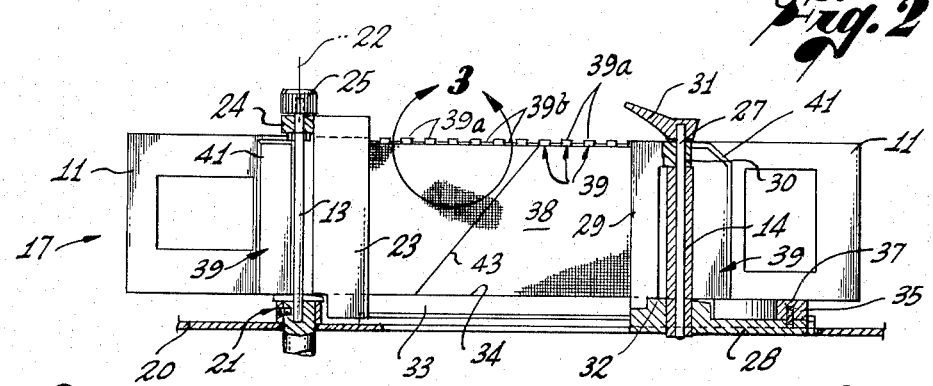
FIG. 2 is an enlarged fragmentary cross-sectional view taken substantially alone the line 2—2 of FIG. 1 after the slide holder has been placed in the projector.
Figure 3:
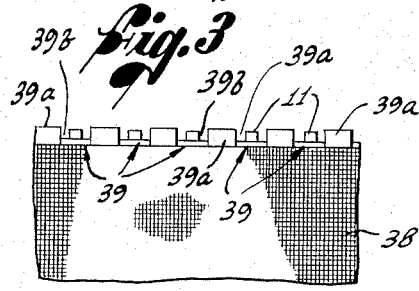
FIG. 3 is an enlarged fragmentary elevational view of a portion of the inner side of the slide holder, along one edge thereof, taken with the arc 3 of FIG. 2.

As shown most clearly in FIG. 2, the two supporting elements 13 and 14 project upwardly from a horizontal base plate 20 forming the bottom of the recess 15, the element 13 being a shaft of square cross-section mounted on a hub 21 which has a stem journaled in a hole, the base plate 20 for rotation of the hub and the shaft about a fixed axis 22. A bracing bracket 23 is secured to the base plate adjacent the right side of the square shaft and extends upwardly along the latter, with an arm 24 at its upper end through which the upper end portion of the shaft projects. This portion of the shaft is cylindrical and is rotatably received in the arm 24, and a knurled cap 25 is pressed onto the upper end of the shaft.

The other supporting element 14 is a roller which is mounted for rotation about an axis parallel to the axis 22 of the square shaft 13, and also is movable toward and away from the square shaft to contract and expand the supporting elements. For this purpose, the roller is rotatably supported on a pin 27 which projects upwardly from a slidable base 28 and is braced by a second bracket 29 which projects upwardly from the base along the right side (FIG. 2) of the pin. An arm 30 on the upper end of the bracket, somewhat below the level of the arm 24, on the other bracket, has a bore through which the pin extends, and a knob 31 is pressed onto the upper end of the pin above the arm 30. The roller thus is rotatably supported between the arm 30 and the base 28, the arm preferably having a rounded end constituting an extension of the right side (FIG. 2) of the roller.

The lower end of the pin 27 extends downwardly into a hub 32 formed on the slidable base 28, and means (not shown) are provided for supporting the base for back and forth sliding, to slide the roller back and forth between expanded and contracted positions, and also for holding the base in the expanded position with a selected spring tensioning force. Thus, a slide holder 10 may be fitted around the supporting elements 13 and 14 when the latter have been moved together, or contracted, to a spacing less than the length of the opening in the holder, and then may be tensioned around the supporting elements by sliding the roller away from the shaft.

To locate the slide holder 10 and the slides 11 thereon at the proper level in the projector 12, the upper sides of the hubs 21 and 32 are positioned to engage the lower edge of the slide holder, and two positioning rails 33 (FIG. 2) are arranged on opposite sides of the holder with flat upper surfaces 34 for engaging the lower edges of slides 11. A third positioning rail 35 extends between the rails around the right ends thereof, with a flat upper side 37 for engaging the slides 11. Thus, the slide holder 10 is located at the level shown in FIG. 2 prior to, and after, tensioning of the holder, with the upper edge of the holder spaced below the arm 24 on the left bracket 23, and extending around the arm 30 on the right bracket 29, below the knob 31.

Figure 4:
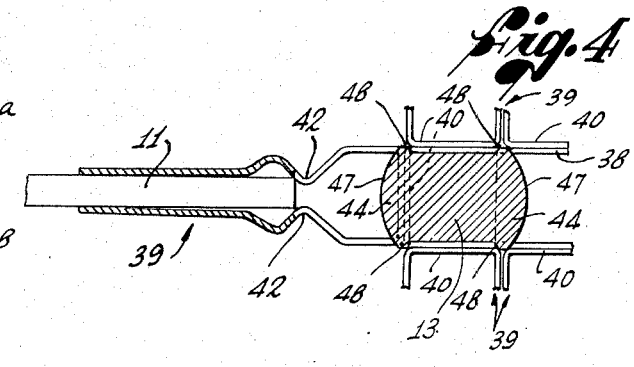
FIG. 4 is a greatly enlarged fragmentary cross-sectional view taken along line 4—4 of FIG. 2, one clip of the slide holder being shown in full section and the others in broken-away section.

The slide holder 10 comprises an endless flexible belt 38 of preselected width and composed of suitable material such as fabric, and a plurality of clips 39 arranged around the outer side of the belt and attached thereto in closely spaced, side-by-side relation. As shown in FIG. 4, each clip is a unitary piece of spring metal with a flat base 40 disposed against the belt and preferably held thereon by an adhesive, and two spring legs extending away from the belt and converging adjacent their free ends, when free, to a spacing less than the thickness of a slide 11, so as to grip and hold the slide between them.

Preferably, the spring legs are pressed together when free, and one leg may be notched and inclined outwardly, as shown at 41 in FIG. 2, to further facilitate insertion. Close to, but spaced from, the base 40 are two internal ribs 42 which are more closely spaced than the thickness of the slides 11, thus serving as a stop for determining the proper, fully inserted position for a slide, and spacing the slide a short distance away from the clip base 40 and the belt 38.

The length of each clip 39 is about the same as the width of the belt 38 and the length of a slide, so that the clips and the slides extend across the width of the belt when perpendicular to the length thereof. The belt preferably is made from a strip of fabric having its ends cut on a bias and then fitted together as indicated at 43 in FIG. 2, and is held in the endless form by the several clips straddling the bias-cut ends and attached to the outer sides thereof. It is to be understood that this type of slide holder is usable in various types of projectors, including the type in the aforesaid patent, and is not limited to the illustrative embodiment shown herein.

With the foregoing arrangement, the slide holder 10 may be advanced step by step in the projector 12 by turning the square shaft 13 through successive angular increments equal to the width of one clip 39. This advances successive slides 11 into the projection position 17, in which the slide extends across the film gate of the projector from one side of the square shaft, the right side in FIG. 1 and the left side in FIG. 2. A reversible drive mechanism (not shown) is provided to index the hub 21 of the square shaft, thereby turning the shaft and driving the slide holder.

In accordance with the present invention, a novel drive coupling is provided between the driven shaft 13 and the slide holder 10 to insure against slipping of the holder, thereby insuring that each slide is fed properly into the projection position 17 in response to turning of the driven shaft. This drive coupling uses the clips 39 as drive abutments on the slide holder for engagement with driving teeth 44 on the driven shaft 13, preferably with portions of the clips along one edge of the belt overhanging the belt for engagement with the teeth.

More specifically, as shown in FIGS. 1 through 4, alternating clips 39 on the belt 38 have one end portion 39$^a$ which projects a preselected distance beyond the adjacent edge 45 of the belt, and beyond the ends 39$^b$ of the intervening clips between the projecting ends, so as to define alternating recesses and drive abutments along this edge of the belt. The teeth 44 on the shaft 13 are formed on opposite flat sides of the shaft, adjacent but above the level of the edge 45 when the slide holder is in place, and thus interfit in driving relation with the projecting end portions 39$^a$. It will be evident that the stop ribs 42 hold the slides 11 in the clips away from the bases 40 far enough to avoid interference between the slides and the teeth 44.

Clips 39 of two different lengths preferably are used in this embodiment so that the opposite or lower ends of the clips may be aligned to slide smoothly around the hubs 21 and 28. The shorter clips are equal in length to, or slightly longer than, the width of the belt, and the longer clips are slightly longer. In all other respects, the clips may be identical.

As shown most clearly in FIG. 4, the teeth 44 have arcuate end surfaces 47, and narrow side surfaces 48 which are spaced to fit closely between the bases 40 of two non-adjacent longer clips, in the recess at the end of short clip positioned between them. Thus, if there is any tendency toward slipping, the end surfaces 48 block the slipping and positively drive the slide holder 10 through the projecting end portions 39$^a$ of the two longer clips on opposite sides of each tooth 44.

With the foregoing arrangement, the slide holder 10 can be mass-produced with fabric strips and two sets of clips 39 having the desired lengths for providingng the protecting end portions 39$^a$ on alternating clips around the belt. With two different lengths, the ends along the opposite edge of the belt may be aligned for a smooth sliding surface thereon. As the holder 10 is inserted in the projector 12, however, a little care is required to insure that the overhanging ends of the clips are along the upper edge of the belt, and that the teeth on the shaft are aligned with recesses between two of the longer clips. To assist the user in this respect, the upper edge of the belt 38 may be marked, for example, with a colored internal line (not shown) to indicate the upper edge.

A second embodiment, which presently is preferred, is shown in FIGS. 5 through 8. This embodiment has all of the advantages of the first embodiment, and in addition, makes it possible to use clips that are all of the same length and simplifies the installation of the slide holder with the driving recesses properly positioned to receive the teeth on the driving shaft. Corresponding parts in this embodiment are indicated by the same reference numbers used in FIGS. 1 through 4.

In this instance, each of the clips 39 has one end portion 39$^a$ which projects beyond the edge of the belt 38, and an aperture 39$^c$, herein circular, is punched, drilled or otherwise formed in the overhanging portion of the base 40. This aperture is formed in the same position in each clip, preferably centered between the longitudinal edges of the base and also between the edge of the belt and the end of the base. Thus, the edges of the apertures form the driving abutments on the clips.

The teeth 44 are simply small tabs projecting radially from opposite sides of the shaft 13, and should be tapered radially outwardly to rounded tips 47. Sufficient clearance is provided for easy engagement of the teeth with the apertures when the two are generally aligned as the holder is placed in the projector, and also to accommodate the turning of the teeth into the aperture as illustrated in FIG. 7.

Since the teeth on the shaft 13 need not engage the fabric belt 38, there is no problem of deformation or fraying of the belt by the teeth, which are engageable with the hard and unyieldable abutments formed by the clips themselves. Thus, the clips serve the dual purposes of holding the slides 11 and also providing the abutment surfaces of a toothed coupling between the shaft 13 and the slide holder 10.

It will be apparent that, while specific embodiments of the invention have been illustrated and described, various changes and modifications may be made by those skilled in the art without departing from the spirit and scope of the invention.

I claim:

1. In a slide projector, the combination of:

an endless flexible slide holder comprising a plurality of slide holding clips each having a flat base and a pair of outwardly projecting spring arms for gripping a slide, and an endless flexible fabric belt, said clips being arranged around the outer side of said belt with said bases secured to the belt in closely spaced, side-by-side relation across the width of the belt;

first and second elongated supporting elements in spaced parallel relation extending through said belt and supporting the slide holder for step-by-step feeding to move said clips one by one into a projection position extending outwardly from one of said supporting elements, said first supporting element being a rotary shaft for driving said slide holder;

alternating clips around said belt having ends which are spaced beyond one edge of said belt a preselected distance, and the intervening clips having ends along said one edge which are spaced from the ends of said alternating clips, thereby to define alternating drive recesses and drive abutments along said one edge;

and a pair of generally radial teeth on said shaft projecting in opposite directions therefrom along said one edge to interfit with the projecting end portions of the clips and form a positive driving connection with said slide holder preventing slipping of the latter relative to said shaft.

2. The combination as defined in claim 1 in which said shaft is said one supporting element and is square in cross-section, said teeth being formed on oppositely facing flat sides of said shaft.

3. The combination as defined in claim 2 in which said teeth have arcuate end surfaces and generally flat side surfaces engageable with said clips adjacent the bases thereof, said side suraces being spaced apart a distance slightly greater than the width of the flat sides of said shaft.

4. The combination as defined in claim 1 in which the ends of said clips along the other edge of said belt are aligned.

5. The combination as defined in claim 1 further including stop means on said clips for holding slides away from said bases and preventing interference between the slides and said teeth.

6. In a slide projector, the combination of:

an endless flexible slide holder comprising a plurality of slide-holding clips arranged in an endless series in side-by-side relation to receive and hold a series of slides in outwardly projecting side-by-side relation, and an endless flexible belt narrower than the length of said clips flexibly joining said clips together in said endless series with end portions of said clips projecting beyond one edge of said belt;

first and second elongated supporting elements in spaced parallel relation extending through said slide holder and supporting the latter for step-by-step feeding to move said clips one by one into a projection position extending outwardly from one of said supporting elements, said first supporting element being a rotary shaft for driving said slide holder;

means on the projecting end portions of said clips forming driving abutments on said slide holder along said one edge of said belt;

and means on said shaft for interfitting with said driving abutments to drive said slide holder positively around said supporting elements in response to rotation of said shaft.

7. The combination as defined in claim 6 in which alternating clips of said series have end portions projecting beyond the ends of the intervening clips and forming said driving abutments.

8. The combination as defined in claim 6 in which said driving abutments are the edges of apertures in said clips adjacent the edge of said belt.

9. For use in a slide projector having two supporting elements, one of which is a shaft having toothed driving means thereon, a slide holder comprising:

an endless flexible belt;

and a plurality of slide-holding clips arranged around said belt and each having a base attached to the outer side of the belt and a pair of spring arms extending outwardly from the base to receive and hold a slide, said clips having end portions which project beyond one edge of said belt, and means defining driving recesses in said clips along said one edge of said belt to receive said toothed means on said shaft, whereby said clips serve as driving abutments engageable with said toothed means.

10. For use in a slide projector having two supporting elements, one of which is a shaft having toothed means thereon, a slide holder having:

an endless flexible belt;

and a plurality of slide-holding clips arranged around said belt and each having a base attached to the outer side of the belt, said clips having end portions which project beyond one edge of the belt, and the base of each clip having an aperture in the overhanging portion located for driving engagement wih said toothed means.

* * * * *